(12) United States Patent
Archangel

(10) Patent No.: US 9,022,302 B2
(45) Date of Patent: May 5, 2015

(54) FEED INJECTOR TIP CAP

(71) Applicant: General Electric Company, Schenectady, NY (US)

(72) Inventor: Danielle Yarber Archangel, Porter, TX (US)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 13/830,833

(22) Filed: Mar. 14, 2013

(65) Prior Publication Data

US 2014/0263746 A1 Sep. 18, 2014

(51) Int. Cl.
*B05B 15/00* (2006.01)
*F23D 14/58* (2006.01)
*C10J 3/50* (2006.01)
*F23D 14/76* (2006.01)
*C10K 1/00* (2006.01)

(52) U.S. Cl.
CPC ............ *F23D 14/58* (2013.01); *Y10T 29/49723* (2015.01); *Y10T 29/4973* (2015.01); *Y10T 29/49826* (2015.01); *C10J 3/506* (2013.01); *F23D 14/76* (2013.01); *F23D 2201/30* (2013.01); *F23D 2212/10* (2013.01); *F23D 2900/00018* (2013.01); *C10J 2200/152* (2013.01); *C10K 1/00* (2013.01); *C10J 2300/1653* (2013.01); *C10J 2300/1678* (2013.01); *Y02E 20/16* (2013.01); *Y02E 20/18* (2013.01)

(58) Field of Classification Search
CPC ............ F02M 51/0621; F02M 51/066; F02M 51/0653; F02M 45/00; F02M 59/466; F02M 59/366
USPC ............ 239/533.12, 533.14, 533.2, 396, 397, 239/103
See application file for complete search history.

(56) References Cited

U.S. PATENT DOCUMENTS

| | | | |
|---|---|---|---|
| 2,558,779 | A | 7/1951 | Pesce |
| 4,408,722 | A * | 10/1983 | Frelund .......................... 239/453 |
| 5,947,716 | A * | 9/1999 | Bellamy et al. ............... 431/159 |
| 5,954,491 | A * | 9/1999 | Helton et al. .................. 431/159 |
| 6,212,218 | B1 | 4/2001 | Shver |
| 6,358,041 | B1 * | 3/2002 | Whittaker et al. ............. 431/160 |
| 6,755,355 | B2 | 6/2004 | Whittaker |
| 2003/0197071 | A1 | 10/2003 | Whittaker |
| 2004/0110041 | A1 | 6/2004 | Merrill et al. |
| 2010/0229558 | A1 | 9/2010 | Dimascio et al. |
| 2011/0256489 | A1 | 10/2011 | Douglas |

OTHER PUBLICATIONS

PCT Search Report and Written Opinion issued Jun. 3, 2014 in connection with corresponding PCT Patent Application No. PCT/US2014/019858.

* cited by examiner

Primary Examiner — Davis Hwu
(74) Attorney, Agent, or Firm — Fletcher Yoder, P.C.

(57) ABSTRACT

A system includes a gasification feed injector. The gasification feed injector includes a tip portion disposed at a fluid exit region of the gasification feed injector, and a tip cap coupled to the tip portion of the gasification feed injector and configured to serve as a thermal barrier for the tip portion during gasification reactions.

13 Claims, 7 Drawing Sheets

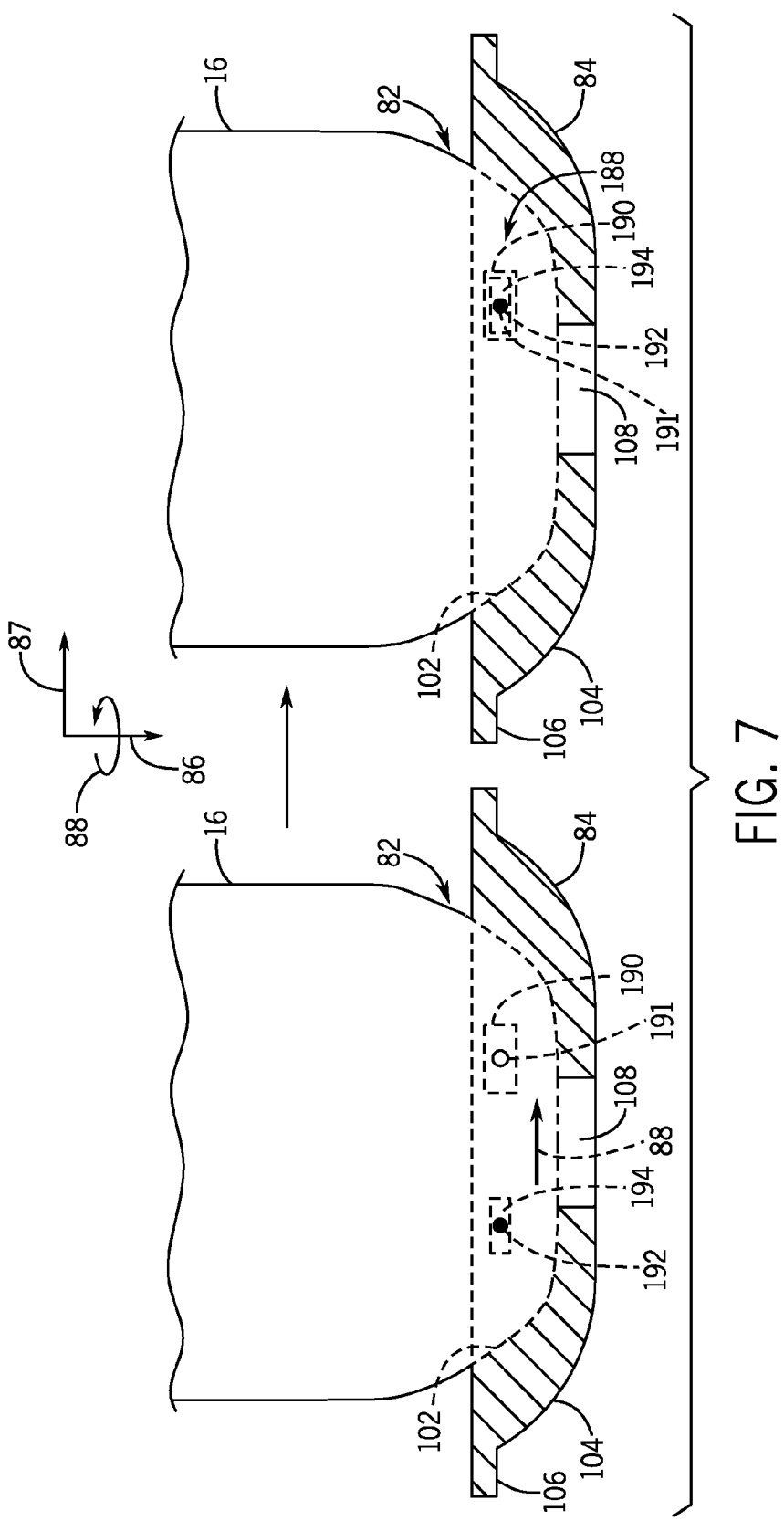

FEED INJECTOR TIP CAP

BACKGROUND OF THE INVENTION

The subject matter disclosed herein relates to feed injectors, and, more particularly, to a tip cap for a gasification feed injector.

A variety of reactors and/or combustion systems employ feed injectors to inject a feedstock into a combustion chamber. For example, an integrated gasification combined cycle (IGCC) power plant includes a gasifier with one or more feed injectors. The feed injectors supply a fuel or feedstock, such as an organic feedstock, into the gasifier along with oxygen and steam to generate a syngas. In general, a gasification reaction occurs downstream from the feed injectors. However, a flame and/or heat from the reaction in close proximity to the feed injectors can reduce the life of the feed injectors, particularly if the feed injectors exceed certain temperatures. For example, the feed injector may be subject to increasingly greater temperatures toward the tip and/or other locations close to the flame. The lives of feed injectors may be reduced by such high temperatures, even when cooling techniques are used.

BRIEF DESCRIPTION OF THE INVENTION

Certain embodiments commensurate in scope with the originally claimed invention are summarized below. These embodiments are not intended to limit the scope of the claimed invention, but rather these embodiments are intended to provide a brief summary of possible forms of the invention. Indeed, the invention may encompass a variety of forms that may be similar to or different from the embodiments set forth below.

In a first embodiment, a system includes a gasification feed injector. The gasification feed injector includes a tip portion disposed at a fluid exit region of the gasification feed injector. The tip portion includes a first abutment surface having a first geometry. The system also includes a tip cap coupled to the tip portion of the gasification feed injector, wherein the tip cap is configured to serve as a thermal barrier for the tip portion during gasification reactions. The tip cap includes: a second abutment surface facing the first abutment surface and having a second geometry, wherein the second geometry substantially mirrors the first geometry; and an outer surface. The outer surface includes a third geometry, wherein the third geometry is convex with respect to the gasification feed injector.

In a second embodiment, a method includes coupling a tip cap to a tip portion of an exit region of a gasification feed injector. A thickness of the tip cap varies through the entire diameter of a body of the tip cap. The tip cap is configured to serve as a thermal barrier for the tip portion during gasification reactions.

In a third embodiment, an apparatus includes a tip cap having a body which has a first annular opening, and the thickness of the body increases in a direction radially away from the first annular opening. The body also has a first abutment surface disposed on the body, and the first abutment surface has a first geometry that substantially mirrors a second geometry of a second abutment surface of a gasification feed injector. The body also includes a lip extending circumferentially around and radially away from the body, and the lip has a lip diameter that is larger than an injector diameter of the gasification feed injector.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 7 is an axial cross-section of an embodiment of a feed injector coupled to the tip cap of FIG. 2 with a tapered face connection.

DETAILED DESCRIPTION OF THE INVENTION

Figure 1:
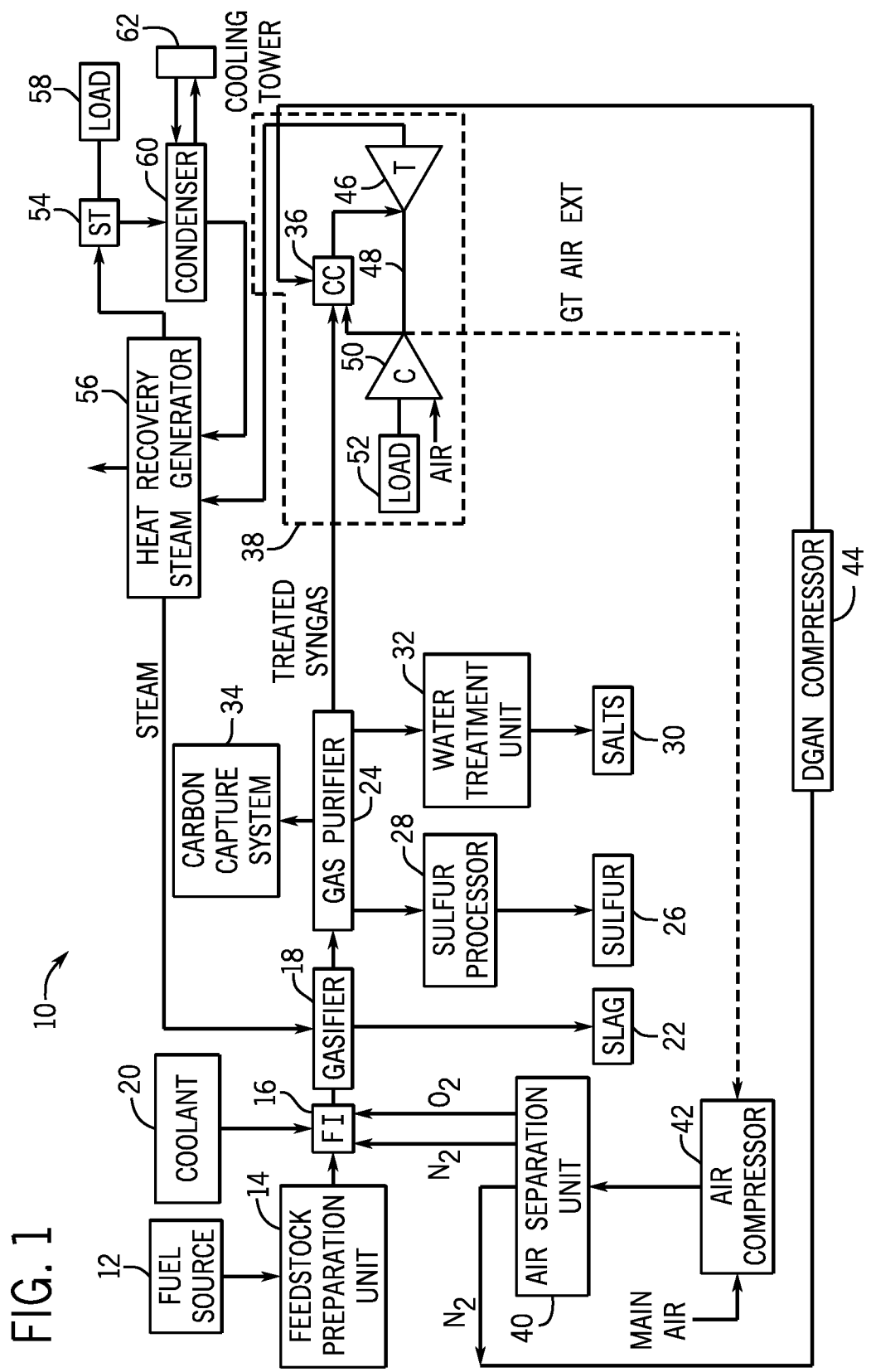
FIG. 1 is a block diagram of an embodiment of an IGCC power plant having a gasifier that uses a feed injector, the feed injector having a tip cap in accordance with present embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A reactor or combustion system may utilize feed injectors to inject a feedstock or fuel, and other fluids such as oxygen and water, into a chamber (e.g., from gasification or partial combustion). In the present discussion, the terms fuel and feedstock may be used interchangeably, and may refer to any substance used to drive a reaction, gasification, partial combustion, or complete combustion. Likewise, the terms reaction, combustion, and gasification may be used interchangeably, and may refer to one or more chemical reactions, combustion, and/or gasification. In certain embodiments, an IGCC power plant may have a gasifier that includes one or more gasification feed injectors. Because certain processes that occur during gasification (e.g., partial combustion) occur near a tip of the feed injector, the tip may be exposed to temperatures up to approximately 1,300 degrees Celsius (° C.). In addition, hot combustion gases may recirculate back toward the feed injector. Such high temperatures may cause damage to the feed injector, even in embodiments where the injector is made from materials specifically designed for high temperatures. Accordingly, different cooling methods may be used to increase the life of feed injectors. For example, feed injector tips may have an integral coolant chamber to flow a coolant. In addition, a cooling coil may surround the body of the feed injector to carry coolant to the coolant chamber. However, such methods can be insufficient because an outer surface of the feed injector may be exposed to hot recirculated gases, while an inner surface of the feed injector is in contact with the coolant. For example, the temperature of the coolant may be approximately 40° C., resulting in a temperature difference of approximately 1,260° C. Such a large temperature gradient may result in thermal stresses, which in some cases can cause cracks near the tip of the feed injector. In some embodiments, the high temperatures and temperature fluctuations may cause radial cracks near the tip. In addition, high strain forces caused by the high temperature gradient may cause circumferential cracks. Thicker coolant chamber walls designed for strength may inhibit heat transfer, contributing to large temperature gradients. Overall, such thermal stresses may reduce the life of the feed injector.

With the foregoing in mind, the disclosed embodiments include a tip cap coupled to a tip portion of a gasification feed injector. The tip portion may be at a fluid exit region of the gasification feed injector, and the cap may serve as a thermal barrier (or heat shield) for the tip portion during gasification reactions. In certain embodiments, the tip cap may entirely separate the tip portion from a reaction zone, and may include an annular opening that corresponds to an annular opening in the tip portion.

Turning now to the drawings, FIG. 1 is a diagram of an embodiment of an IGCC system 10 that may produce and burn a synthetic gas, i.e., syngas, to generate power. As discussed in detail below, the IGCC system 10 may include an embodiment of a gasification feed injector that includes a tip cap, which may be a thermal barrier capable of withstanding temperatures in excess of those found in the gasification reaction environment. In certain embodiments, the tip cap may serve as a sacrificial thermal barrier—one that can be replaced at regular intervals or as appropriate. The tip cap may act as a heat shield to the tip portion, reducing thermal fatigue and resulting surface cracks. While the present embodiments of the tip cap are discussed in the context of the IGCC system 10, the IGCC system 10 is used as one non-limiting example, and it should be understood that the tip cap may be used in other types of systems in which gasification is used. Other elements used by the IGCC system 10 may include a fuel source 12, which may be a gas, solid, or a liquid, and which may be utilized as a source of energy for the IGCC system. By way of non-limiting example, the fuel source 12 may include coal, petroleum coke, oil, biomass, wood-based materials, agricultural wastes, tars, coke oven gas and asphalt, or other carbon containing items.

The fuel of the fuel source 12 may be passed to a feedstock preparation unit 14. The feedstock preparation unit 14 may, for example, resize or reshape the fuel source 12 to generate feedstock. Additionally, water, or other suitable liquids (e.g., alcohols) may be added to the fuel source 12 in the feedstock preparation unit 14 to create slurry feedstock. In other embodiments, no liquid is added to the fuel source, thus yielding dry feedstock. In further embodiments, the feedstock preparation unit 14 may be omitted if the fuel source 12 is a liquid.

Next, the feedstock may be passed to a feed injector 16 coupled to (e.g., secured to and/or within) a gasifier 18. While the present embodiments are discussed in the context of an IGCC system having a gasifier that utilizes the feed injector and feed injector tip cap disclosed herein, it should be noted that the gasifier 18 is merely one example of a combustion chamber that may use the feed injector 16 with the structural supports and multiple coolant passages as discussed in detail below. Indeed, the feed injector 16 having the tip cap of the present disclosure may be utilized in a variety of other contexts where reactions or combustion processes may degrade an injector. In certain embodiments, the feed injector 16 combines the various feed streams to the gasifier 18 in such a manner as to promote efficient gasification. Specifically, the gasifier 18 may convert the feedstock into a syngas, e.g., a combination of carbon monoxide and hydrogen. This conversion may be accomplished by subjecting the feedstock to a controlled amount of steam, oxygen, or carbon dioxide at elevated pressures and temperatures, depending on the type of gasifier 18 utilized. The gasification process may include the feedstock undergoing a pyrolysis process, whereby the feedstock is heated. Temperatures inside the gasifier 18 may widely vary, and as an example can range from approximately 150° C. to 700° C. during the pyrolysis process, depending on the fuel source 12 utilized to generate the feedstock. The heating of the feedstock during the pyrolysis process may generate a solid (e.g., char) and residue gases (e.g., carbon monoxide, hydrogen, and nitrogen).

A partial combustion process may then occur in the gasifier 18. The combustion may include introducing controlled amounts of oxygen to the char and residue gases (e.g., via the feed injector 16). The char and residue gases may react with the oxygen to form carbon dioxide and carbon monoxide, which provides heat for the subsequent gasification reactions. The temperatures during the combustion process may, as an example, range from approximately 700° C. to 920° C. Next, steam may be introduced into the gasifier 18 during a gasification step (e.g., via the feed injector 16). The char may react with the carbon dioxide and steam to produce carbon monoxide and hydrogen at temperatures ranging from approximately 800° C. to 24° C. In essence, the gasifier 18 utilizes steam and oxygen to allow some of the feedstock to be "burned" to produce carbon monoxide and release energy, which drives a second reaction that converts further feedstock to hydrogen and additional carbon dioxide. In view of the foregoing, it should be appreciated that the feed injector 16 may be subjected to a wide variety of temperatures and potentially corrosive materials. Again, the tip cap of the present disclosure, which is attached to the feed injector 16, may help mitigate the effects of these high temperature gases on the feed injector 16 (e.g., a tip and/or body of the feed injector 16).

For example, the resultant gas generated by the gasification process may include mainly carbon monoxide and hydrogen, as well as $CH_4$, HCl, HF, COS, $NH_3$, HCN, and $H_2S$. This resultant gas may be termed untreated syngas, because it includes, for example, $H_2S$. In addition to the gaseous products, the gasifier 18 may also generate waste, such as slag 22, which may be a wet ash material. This slag 22 may be removed from the gasifier 18 and disposed of, for example, as road base or as another building material.

A gas purifier 24 may be utilized downstream of the gasifier 18 to process the untreated syngas. For example, in one embodiment, the gas purifier 24 may include water gas shift reactor. The gas purifier 24 may scrub the untreated syngas to remove the HCl, HF, COS, HCN, and $H_2S$ from the untreated syngas, and may include separation of sulfur 26 in a sulfur processor 28 by, for example, an acid gas removal process in the sulfur processor 28. Furthermore, the gas purifier 24 may separate salts 30 from the untreated syngas via a water treatment unit 32 that may utilize water purification techniques to generate usable salts 30 from the untreated syngas. Subsequently, the gas from the gas purifier 24 may include treated syngas (e.g., the sulfur 26 has been removed from the syngas), with trace amounts of other chemicals, e.g., $NH_3$ (ammonia) and $CH_4$ (methane).

In some embodiments, a carbon capture system 34 may remove and process the carbonaceous gas (e.g., carbon dioxide) included in the syngas. The carbon capture system 34 also may include a compressor, a purifier, a pipeline that supplies $CO_2$ for sequestration or enhanced oil recovery, a $CO_2$ storage tank, or any combination thereof. The treated syngas, which has undergone the removal of its sulfur containing components and a large fraction of its carbon dioxide, may be then transmitted to a combustor 36, e.g., a combustion chamber, of a gas turbine engine 38 as combustible fuel.

The IGCC system 10 may further include an air separation unit (ASU) 40. The ASU 40 may operate to separate air into component gases by, for example, distillation techniques. The ASU 40 may separate oxygen from the air supplied to it from a supplemental air compressor 42, and the ASU 40 may transfer the separated oxygen to the feed injector 16. Additionally, the ASU 40 may transmit separated nitrogen to the feed injector 16 (e.g., as coolant 20) or a diluent nitrogen (DGAN) compressor 44. The DGAN compressor 44 may compress the nitrogen received from the ASU 40 at least to pressure levels suitable for use in the combustor 36. The nitrogen may be used as a diluent to facilitate control of emissions, for example.

The gas turbine engine 38 may include a turbine 46, a drive shaft 48, and a compressor 50, as well as the combustor 36. The combustor 36 may receive fuel, such as syngas or substitute natural gas, compressed air from the compressor 50 and compressed nitrogen from the DGAN compressor 44. Combustion of the fuel within the combustor 36 creates hot pressurized exhaust gases, which are used to drive the turbine 46, which causes the turbine 46 to rotate the drive shaft 48 along an axis of the gas turbine engine 38. As illustrated, the drive shaft 48 is connected to various components of the gas turbine engine 38, including the compressor 50. The drive shaft 48 may also be connected to load 52, which may be a stationary load, such as an electrical generator for producing electrical power, for example, in a power plant. Indeed, load 52 may be any suitable device that is powered by the rotational output of the gas turbine engine 38.

The IGCC system 10 also may include a steam turbine engine 54 and a heat recovery steam generation (HRSG) system 56. The steam turbine engine 54 may drive a second load 58. The second load 58 may also be an electrical generator for generating electrical power. However, both the first 52 and second 58 loads may be other types of loads capable of being driven by the gas turbine engine 38 and steam turbine engine 54. In addition, although the gas turbine engine 38 and steam turbine engine 54 may drive separate loads 52 and 58, as shown in the illustrated embodiment, the gas turbine engine 38 and steam turbine engine 54 may also be utilized in tandem to drive a single load via a single shaft. The specific configuration of the steam turbine engine 54, as well as the gas turbine engine 38, may be implementation-specific and may include any combination of sections.

Heated exhaust gas from the gas turbine engine 38 may be transported into the HRSG 56 and used to heat water and produce steam used to power the steam turbine engine 54. Exhaust from, for example, a low-pressure section of the steam turbine engine 54 may be directed into a condenser 60. The condenser 60 may utilize a cooling tower 62 to exchange heated water for chilled water. The cooling tower 62 acts to provide cool water to the condenser 60 to aid in condensing the steam transmitted to the condenser 60 from the steam turbine engine 54. Water from the cooling tower 62 may also be used as coolant 20 for the feed injector 16, which may be used in addition to the tip cap to mitigate the effects of the high temperatures in the gasifier on the feed injector 16.

Additionally or alternatively, the steam produced by the HRSG 56 may be supplied to the gasifier 18 or to the feed injector 16 as the coolant 20. The hot recirculating gases inside the gasifier 18 may thermally stress the feed injector 16, particularly the portion of the feed injector 16 closest to the combustion chamber (e.g., the tip of the feed injector 16). Again, the feed injector tip cap of the present embodiments may reduce thermal stress on the feed injector 16 tip by at least partially blocking the recirculating gases, thereby preventing them from contacting the tip of the feed injector 16. By reducing thermal stress and thermal fatigue on the feed injector 16, the tip cap may extend the life cycle and reduce the operational costs of the system 10. Furthermore, the tip cap 84 enables the feed injector 16 to be a serviceable component, where the tip cap 84 may be replaced at intervals but the feed injector 16 may be retained for a longer period than would otherwise be attainable.

Figure 2:
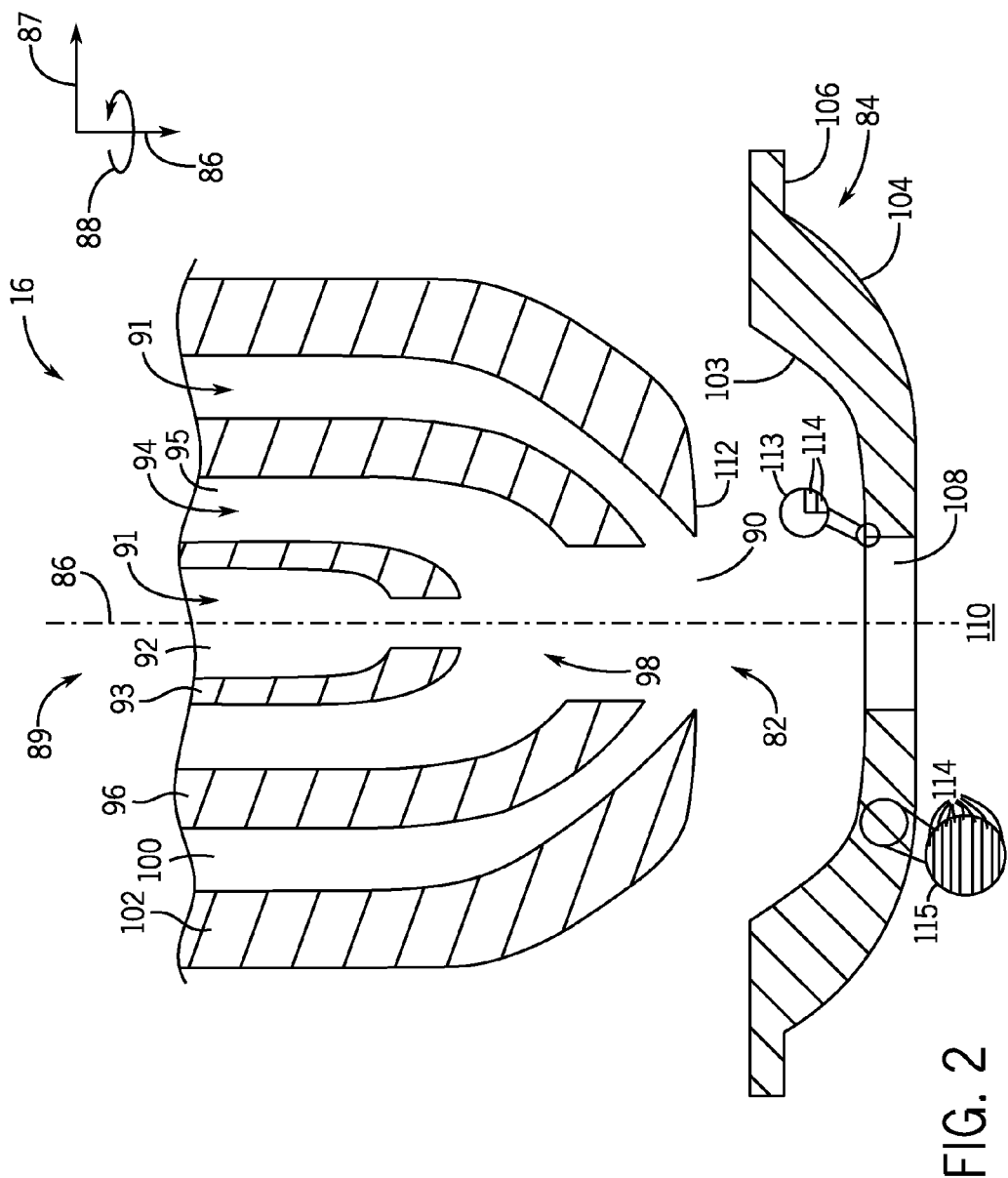
FIG. 2 is an axial cross-section of an embodiment of a feed injector having a tip cap.

With the forgoing in mind, FIG. 2 is an axial cross-section of the feed injector 16 having a tip portion 82 and a tip cap 84, which may fit over the tip portion 82. In the illustrated embodiment, the tip cap 84 and the feed injector 16 couple along an axial axis 86, which passes lengthwise through the center of the feed injector 16 and the tip cap 84. Furthermore, the feed injector 16 has a radial axis 87 and a circumferential axis 88. The feed injector 16 has an upstream side 89 (e.g., upstream relative to a flow of fuel through the feed injector 16), from which the feedstock, oxygen, and other materials may be introduced to the feed injector 16. The feed injector 16 also has an annular opening 90 positioned on the tip portion 82, where the feedstock, oxygen, and other materials may exit the feed injector 16. Thus, the tip portion 82 is an outlet for the materials as they pass from the feed injector 16 to the gasifier 18.

Turning next to the passages of the feed injector 16, although one arrangement of passages will be described, other arrangements are possible depending on the requirements of a particular system (e.g., reactor, gasifier, or general combustion system). In the illustrated embodiment, the innermost material passing through the feed injector 16 is oxygen 91 (e.g., separated oxygen from the ASU 40), which is directed to the tip portion 82 by a first oxygen passage 92 formed by a first annular wall 93 of the feed injector 16. The first oxygen passage 92 supplies the oxygen 91 for combustion downstream of the tip portion 82 of the feed injector 16. In other embodiments, the oxygen 91 may include, but is not limited to, pure oxygen, oxygen mixtures, and air. The next outermost material is a fuel 94, which is directed to the tip portion 82 by a fuel passage 95 formed by a second annular wall 96 of the feed injector 16. Thus, the fuel passage 95 (and wall 96) surrounds the first oxygen passage 92 (and wall 93) in a coaxial or concentric arrangement. As noted above with respect to FIG. 1, the fuel 94 may include a dry fuel, a slurry fuel, a liquid fuel, a gaseous fuel, or any combination thereof. The fuel passage 95 directs the fuel 94 just downstream of oxygen 91 from the first oxygen passage 92 to enhance the mixing of the fuel and oxygen. The region where the oxygen 90 from the first oxygen passage 92 and the fuel 94 combine may be referred to as a pre-mix zone 98.

The next outermost material is oxygen 91, which is directed to the tip portion 82 of the feed injector 16 by a second oxygen passage 100 formed by a third annular wall 102 of the feed injector 16. Thus, the second oxygen passage 100 (and wall 102) surrounds the fuel passage 95 (and wall 96) and the first oxygen passage 92 (and wall 93) in a coaxial or concentric arrangement. The second oxygen passage 100 may direct oxygen 91 to the mixture of the fuel 94 and oxygen 91 from the first oxygen passage 92 to produce a fine spray, which may enhance the efficiency of the reaction (e.g., partial combustion or gasification). The oxygen 91 from the second oxygen passage 100 may also include, but is not limited to, pure oxygen, oxygen mixtures, and air.

As depicted, the tip cap 84 and the tip portion 82 of the feed injector 16 couple to one another along the axial axis 86. The tip cap 84 may include a number of features that enable coupling to and protection of the feed injector 16. In particular, the tip cap 84 may include, but is not limited to, an inner surface 103 that may be in physical contact with the feed injector 16, an outer surface 104 that faces a combustion/gasification zone during use, a lip 106 (e.g., an annular lip) that serves to block recirculating gases from the feed injector 16, and an annular opening 108 that enables the fuel/oxidant mixtures to be provided to the gasification zone. The annular opening 108 may be straight (see FIGS. 4-7) or tapered (see FIGS. 2 and 3) in order to block or deflect heat from the feed injector 16 and to allow fuel through the annular opening 108.

While the tip cap 84 may be constructed from any suitable material, in some embodiments, the tip cap 84 may be constructed of a material, such as a ceramic matrix composite (CMC), having a higher thermal conductivity and a lower thermal coefficient of expansion than the tip portion 82 of the feed injector 16. In other embodiments, the tip cap 84 may be constructed of a material having a thermal conductivity and/or thermal coefficient of expansion that is approximately equal to (e.g., within approximately 5% of) the thermal conductivity and/or thermal coefficient of expansion of the feed injector 16. By way of non-limiting example, the tip cap 84 may be constructed from ceramics, composites, or combination thereof, such as silicon carbide, alumina, aluminum nitride, or mullite. These materials may effectively transfer heat away from the tip portion 82 of the feed injector 16 (e.g., in the radial direction 87), and as a result, the tip cap 84 may serve as a thermal barrier (or heat shield) for the tip portion 82 during gasification reactions.

The tip cap 84 may be configured to couple to the tip portion 82 of the feed injector 16 and entirely separate the tip portion 82 from a reaction zone 110 of the gasifier 18. The tip cap 84 may be positioned substantially coaxially to the annular opening 90 of the tip portion 82 of the feed injector 16, so that fuel may flow through the fuel passage 95 of the feed injector 16, and pass through the annular opening 108 of the tip cap 84 to the reaction zone 110.

When the tip cap 84 and the feed injector 16 are coupled to one another, the inner surface 103 of the tip cap 84 may abut an outer wall 112 of the tip portion 82 of the feed injector 16. In some embodiments, the inner surface 103 (e.g., an abutment surface) of the tip cap 84 may have a first geometry that substantially mirrors (e.g., mirrors to within manufacturing tolerances) a second geometry of the outer wall 112 of the tip portion 82. In other words, the surface 103 and the outer wall 112 may be contoured substantially the same as one another to minimize or substantially eliminate any intermediate gap when the cap 84 is coupled to the injector 18. By having the inner surface 103 substantially mirror the outer wall 112 of the tip portion 82, the tip cap 84 may block hot gases from accumulating in between the tip portion 82 and the tip cap 84.

The outer surface 104 of the tip cap 84 may have a geometry substantially similar to the geometry of the inner surface 103, or it may extend farther outward in the radial direction 87 to form the lip 106. Further, in certain embodiments, the outer surface 104 may be curved, such as curved outward toward a gasification region of the gasifier—i.e., convex with respect to the gasification feed injector 16. In certain embodiments, the outer portion (e.g., near the lip 106) of the tip cap 84 may experience more thermal strain than the inner portion (e.g., near the annular opening 108). For example, recirculating hot gases may be more likely to contact the outermost portion of the tip cap 84 as opposed to the opening 108 where the gasification reagents are ejected. As such, the tip cap 84 may be designed to include a greater thickness proximate the lip 106 (e.g., a greater number of plies for a CMC construction) as opposed to the opening 108. The tip cap 84 may be designed so as to include a thickness gradient in the radial direction 87 from the annular opening 108 to the lip 106. When a CMC construction is used, any number of plies 114 may be used to create this gradient; for example, a portion of the tip cap 84 nearer to the annular opening 108, as illustrated in expanded area 113, may be composed of approximately one to four plies 114, while a portion of the tip cap 84 farther from the annular opening 108, as illustrated in expanded area 115, may be composed of approximately five to ten, or more, plies 114. The plies 114 may be laminated, and may have characteristics (e.g., geometry and/or material composition) which may be uniform or non-uniform within the tip cap 84. For example, the stress or compression loading of the tip cap 84 may not be uniform in the axial 86, radial 87, or circumferential 88 directions, and thus, the characteristics of the plies 114 may be designed to vary within the tip cap 84.

In certain embodiments, the material composition of the plies 114 may be designed for the tip cap 84 to withstand high mechanical or thermal stresses. For example, the plies 114 may be constructed of a ceramic, a metal, a polymer, a fiberglass, an epoxy, another suitable material, or any combination thereof. In certain embodiments, as noted above, the laminated plies 114 may be a ceramic matrix composite. For example, the material composition may alternate from ceramic to metal between adjacent plies 114. In other embodiments, the plies 114 may be a CMC material in which a plurality of fibers (e.g., silicon carbide fibers) are disposed within a matrix material, which may be the same as the material used to construct the fibers, contain one or more components of the materials used to construct the fibers (e.g., silicon/silicon-carbide), or may be different than the fibers.

While described and illustrated in the context of having a thickness that varies in the radial direction 87, the tip cap 84 may be designed to have any suitable configuration that enables the tip cap 84 to serve as a barrier—thermal or otherwise (e.g., as a material barrier). For example, the thickness (e.g., as measured by the number of plies 114) may be substantially constant, or may change in a regular or irregular fashion. For example, the tip cap 84 may be designed to include a greater thickness in regions that experience relatively higher amounts of heat compared to other regions. An increased thickness of the tip cap 84 may increase its heat blocking capacity.

Furthermore, the lip 106 may extend circumferentially 88 and radially 87 about the outer surface 104 of the tip cap 84 in order to span a gap that may exist between the tip portion 82 and the chamber of the gasifier 18 in which it is positioned. By extending farther radially 87 outward, the lip 106 may at least partially black hot recirculating gases from passing around the tip cap 84 and contacting the feed injector 16 (e.g., a body of the feed injector 16). As a result, the tip cap 84 may serve as a thermal and/or material barrier for the tip portion 82 from the reaction zone 110. By reducing thermal stress on the tip portion 82, the tip cap 84 may enable longer operational lifetimes for the feed injector 16 by reducing thermal stresses, which can form cracks (e.g., surface cracks) in the feed injector 16.

Figure 3:
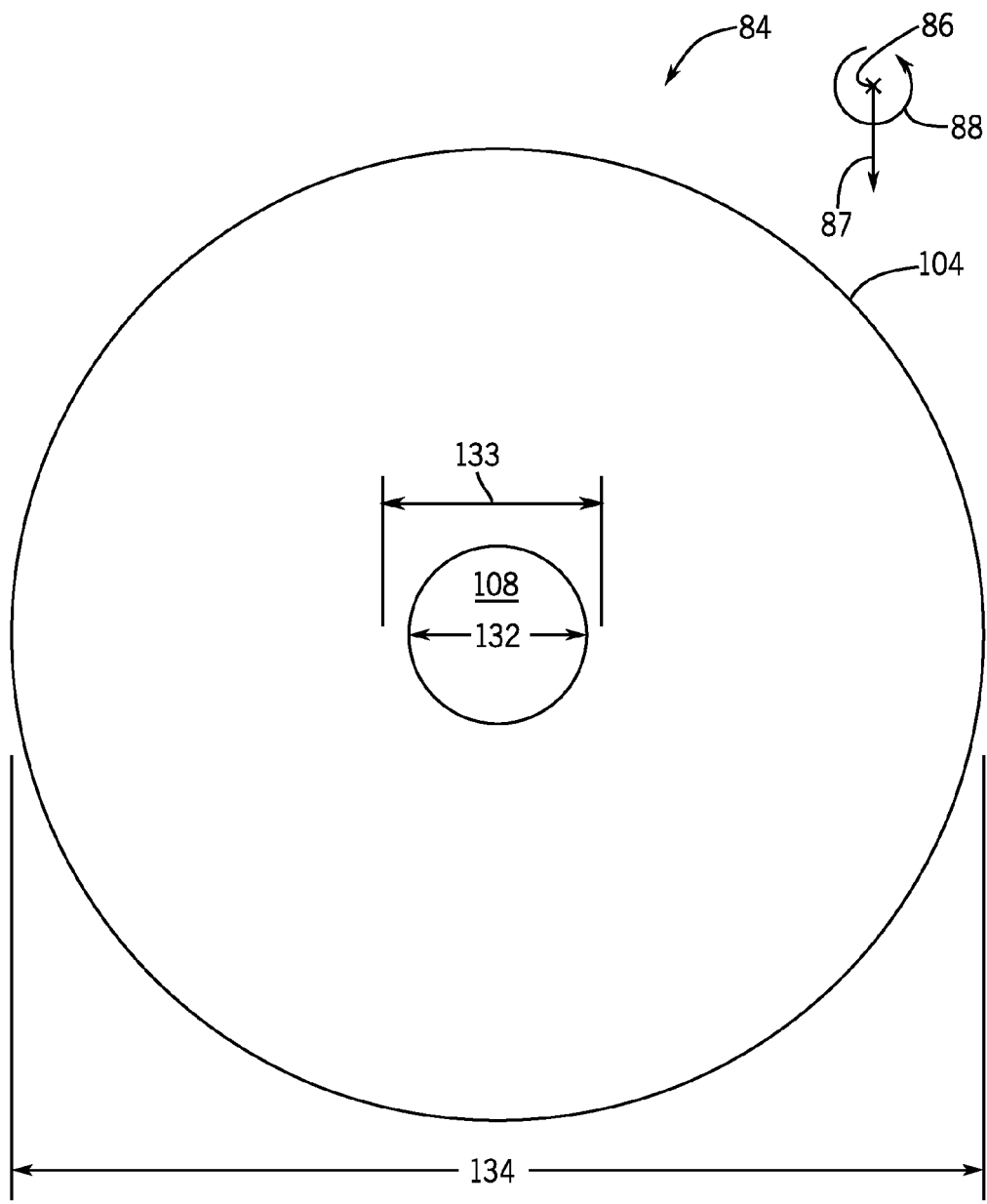
FIG. 3 is an illustration of a front view of an embodiment of the tip cap of FIG. 2.

FIG. 3 is a front view along the axial axis 86 of the tip cap 84. As noted with respect to FIG. 2, the annular opening 108 may be positioned in a substantially coaxial arrangement with respect to the annular opening 90 of the tip portion 82 of the feed injector 16. As noted above with respect to FIG. 2, the annular opening 108 may be straight or tapered. In embodiments where the opening 108 is tapered, the opening 108 may have an inner diameter 132 and an outer diameter 133. The thickness of the tip cap 84 may increase from the inner diameter 132 to the outer diameter 133. For example, the tip cap 84 may be composed of approximately one to four plies 114 near the inner diameter 132, and the tip cap may be composed of approximately five to ten, or more, plies 114.

In this way, the diameter of the annular opening 108 may increase in the axial direction 86 (e.g., in the direction of the fuel flow path). The annular opening 108 may have the diameter 132 suitable for enabling desired feed rates of the fuel, oxygen, and other feed materials. By way of non-limiting example, the diameter 132 of the annular opening 108 may be greater than (e.g., from approximately 10% to 200%, 10% to 90%, or 10% to 40% greater than) the diameter of the annular opening 90 of the feed injector 16. As such, the annular opening 108 may not interfere with the flow (e.g., spray) of fuel from the feed injector 16 as it passes through the annular opening 108. While it may be desirable to have the annular opening 108 sized so as to enable the desired flow amounts, it may also be desirable to have the annular opening 108 be close in size to the annular opening 90 of the tip portion 82 to enable maximum shielding of the tip portion 82 from the reaction zone 110. Therefore, the diameter 132 of the annular opening 108 may be within approximately 50% of the size of, such as within approximately 30%, within approximately 20%, within approximately 10%, within approximately 5%, or within approximately 1% of the size of the diameter of the opening 90. The outer diameter 133 of the annular opening 108 may be greater than (e.g., from approximately 5% to 100%, 5% to 50%, or 5% to 35% greater than) the inner diameter 132 of the annular opening 108. As such, the annular opening 108 may interfere less with the flow (e.g., spray) of fuel from the feed injector 16, as the flow may expand radially 87 as it passes through the annular opening 108.

While the diameter 132 of the annular opening 108 may relate to the ability of the tip cap 84 to enable flow, a diameter 134 of the outer surface 104 generally relates to the barrier size of the tip cap 84, which may include the extent to which the feed injector 16 is covered by the tip cap 84, as well as the extent to which the tip cap 84 blocks recirculating combustion/gasification gases from impinging on the feed injector 16. While the outer surface 104 may have any suitable size, shape, thickness, and so on, the diameter 134 of the outer surface 104 may be smaller, substantially equal to, or larger than the diameter of the tip portion 82 of the feed injector 16, which may be measured at a point of the feed injector 16 where a body of the feed injector 16 begins to taper toward the opening 90. In certain embodiments, it may be desirable for the diameter 134 to be of sufficient size so as to extend between the feed injector 16 and a wall of the gasifier chamber in which the feed injector 16 is positioned. For example, the diameter 134 may extend fully toward the wall of the gasifier chamber (e.g., to within a tolerance that enables insertion and removal), or partially between the outer surface of the feed injector 16 and a wall of the gasifier chamber. For example, the diameter 134 may be such that the outer surface 104 extends between approximately 0% and approximately 100% of the distance between the outer surface of the feed injector 16 and the wall of the gasifier chamber, where 0% is substantially flush with the outer surface of the feed injector 16, and 100% is against the wall of the gasifier chamber. That is, the outer surface 104 may extend between approximately 5% and approximately 95%, approximately 10% and approximately 90%, approximately 20% and approximately 80%, or between approximately 30% and approximately 70% of the distance between the outer surface of the feed injector 16 and the wall of the gasifier chamber.

Again, in certain embodiments, the tip cap 84 may be constructed of a CMC (e.g., silicon carbide, alumina, aluminum nitride, mullite, etc.), which may have a higher thermal conductivity and lower thermal coefficient of expansion than the tip portion 82. Construction from such materials may enable the tip cap 84 to be fastened to the tip portion 82 using a number of different techniques, such as during a retrofit operation or during servicing. For example, coupling techniques may include the use of high temperature threaded fasteners (e.g., bolts or screws capable of withstanding the temperatures in the gasifier), a tapered face connection, a high temperature adhesive (e.g., an adhesive capable of withstanding the temperatures in the gasifier), spring loaded tabs, latches, snap-fit fasteners, interference fits, or the like. These fastening techniques may enable the tip cap 84 to be removed, inspected, maintained, and/or replaced in a number of different ways.

Figure 4:
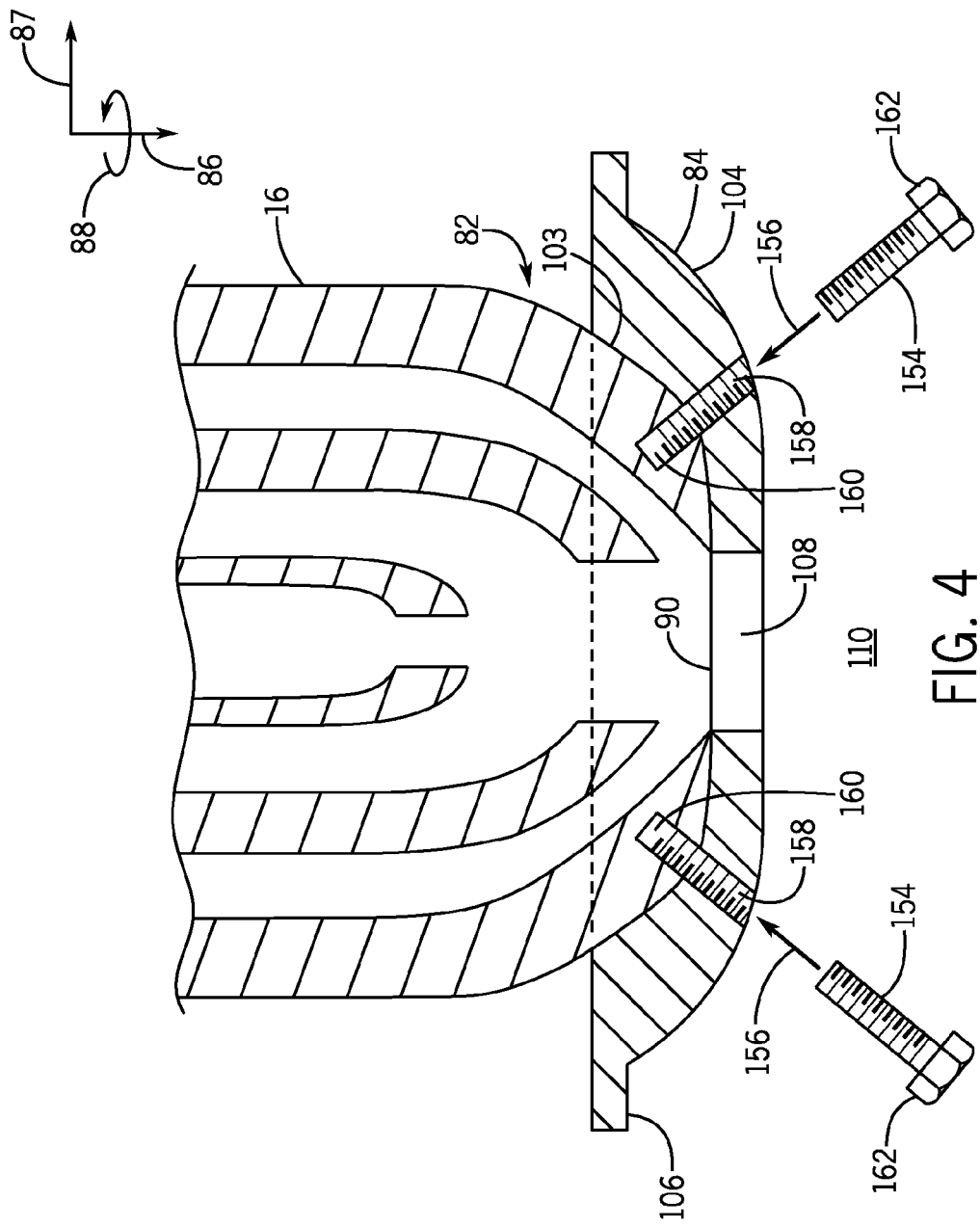
FIG. 4 is an axial cross-section of an embodiment of a feed injector coupled to the tip cap of FIG. 2 with high temperature screws.

FIG. 4 depicts an embodiment of the tip cap 84 coupled to the tip portion 82 with high temperature threaded fasteners, e.g., bolts or screws 154. These high temperature fasteners may be temperature resistant up to at least 1000, 1500, 2000, 2500, or more degrees Celsius. While any number of such threaded fasteners maybe used to secure the tip cap 84 to the feed injector 16, at least two threaded fasteners, such as between two and six, may be used to secure the cap 84. For example, as depicted, two or more (e.g., three) screws 154 may extend in the direction indicated by arrows 156 through apertures 158 in the tip cap 84, and into corresponding apertures 160 (e.g., threaded bores) in the tip portion 82 of the feed injector 16. In certain embodiments, the apertures 158 and 160 may be threaded to allow the screws 154 to secure the cap 84 to the tip portion 82. The screws 154 may be constructed of a high temperature material, such as low and mild carbon steel, alloy steel, steel, stainless steel, aluminum, brass, copper, silicon bronze, titanium, composites, ceramics, or any combination of such materials. Furthermore, the screws 154 may be completely or partially coated with a protective finish (e.g., zinc, cadmium, tin, copper, or ceramic), which may provide further protection from thermal stress from the reaction zone 110. The screws 154 may be spaced circumferentially 88 around the tip cap 84, such as spaced at regular circumferential intervals. Further, the screws 154 may be placed at any radial 87 location between the lip 106 and the annular opening 108. In addition, the screws 154 may be recessed on the outer surface 104 of the tip cap 84. For example, the aperture 158 may have a chamfered edge, which may enable a head 162 of each screw 154 to rest below the outer surface 104 of the tip cap 84.

By way of example, during a retrofit or servicing operation, a technician and/or automated machinery may remove the feed injector 16 from the gasifier 18 (FIG. 1). The technician/automated machinery may then form the apertures 158, 160 in the tip cap 84 and the feed injector 16 by placing the tip cap 84 in abutment with the feed injector 16 and machining the apertures 158, 160 into both. Alternatively, the apertures 158, 160 may be separately formed. Indeed, it may be desirable to use the screws 154 for securing the tip cap 84 to the feed injector 16 to enable the tip cap 84 to be replaced after use. For example, after use, the technician may remove the feed injector 16 and used tip cap 84, unscrew the screws 154, and secure a new or refurbished tip cap 84 to the feed injector 16 after suitable inspection and, where suitable, additional servicing.

Figure 5:
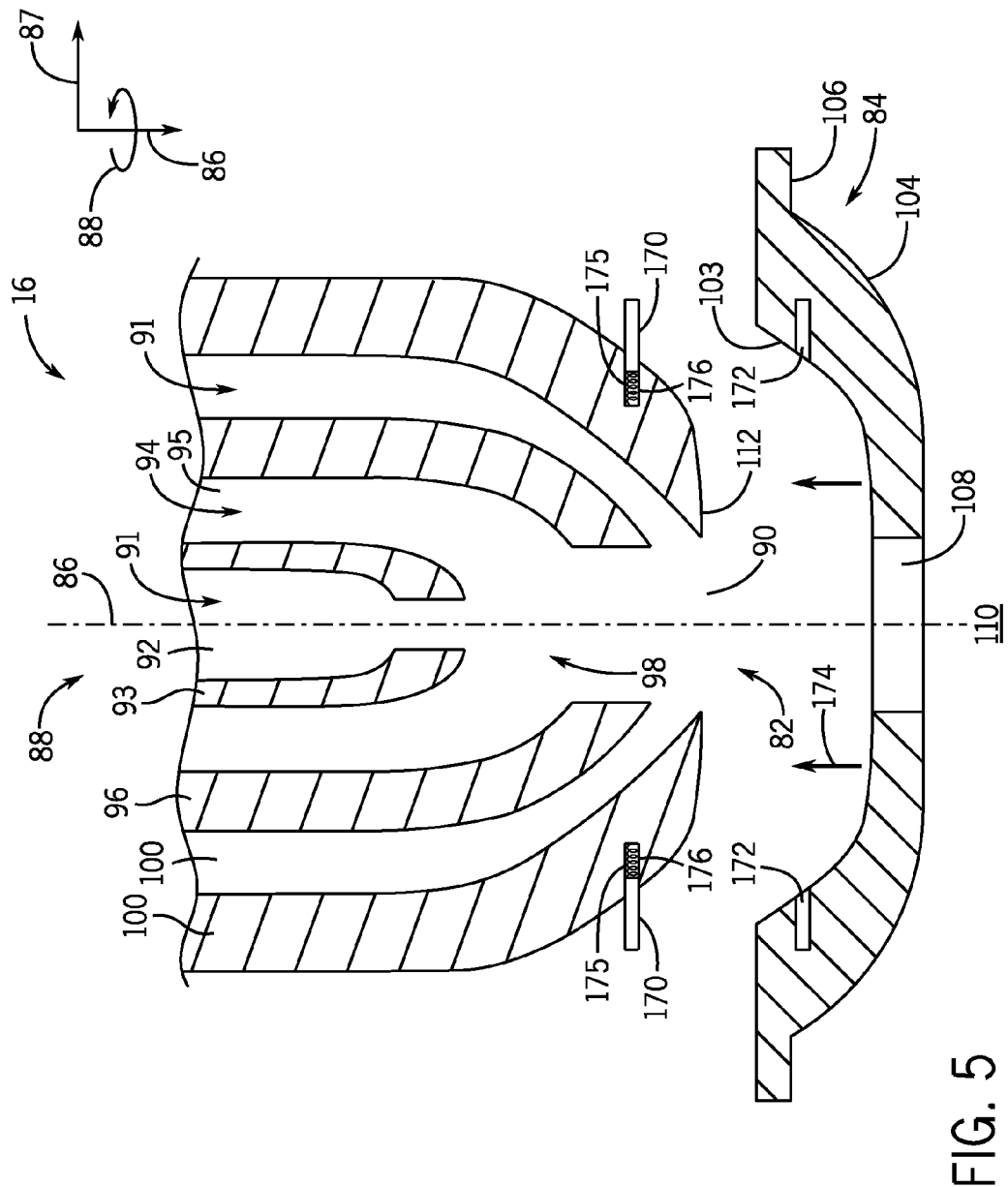
FIG. 5 is an axial cross-section of an embodiment of a feed injector coupled to the tip cap of FIG. 2 with spring loaded tabs.

As set forth above, in another embodiment, the tip cap 84 may be coupled to the tip portion 82 with spring loaded tabs 170, as depicted in FIG. 5. In the illustrated embodiment, the tip portion 82 may be equipped with any suitable number of tabs 170, such as between one and ten, two and six, or between two and four tabs 170. In accordance with present embodiments, the tip cap 84 may have corresponding openings 172 configured to receive the spring-loaded tabs 170 when coupled. The cap 84 may be press fit (e.g., pressed in a direction 174) over the tip portion 82. As the tip cap 84 is pushed toward the tip 82, the inner surface 103 of the tip cap 84 abuts the tabs 170. This abutment causes springs 175 coupled to the tabs 170 to be compressed into recesses 176. In other words, the tabs 170 and their associated springs 175 may be pushed radially 87 inward as the tip cap 84 is secured to the feed injector 16. One the openings 172 pass over the tabs 170, the tabs 170 may release radially 87 outward into the openings 172, creating a locking mechanism that retains the tip cap 84 against the feed injector 16.

In a similar manner to the high temperature screws discussed above, the tabs 170 may also enable a retrofitting and/or servicing operation to be performed. For example, in a retrofit operation, a technician may remove the feed injector 16 from the gasifier 18. The feed injector 16 may be cleaned, etc., and machined to include the recesses 176. The tabs 170 and springs 175 may then be secured into the recesses 176, enabling use with embodiments of the tip cap 84 having the corresponding openings 172.

The springs 175 and/or tabs 170 may be designed so as to include a retrieval mechanism for servicing. For example, the springs 175 and/or tabs 170 may be magnetic so as to enable retraction of the tabs 170 and subsequent removal of the used tip cap 84 from the feed injector 16. Alternatively or additionally, the second oxygen passage 100 may include a retrieval mechanism that is accessible by the technician. The retrieval mechanism may enable the technician to "pull" the tabs 170 radially 87 inward, enabling de-coupling of the tip cap 84 from the feed injector 16. The tip cap 84 may then be replaced, or refurbished and re-secured to the feed injector 16.

Figure 6:
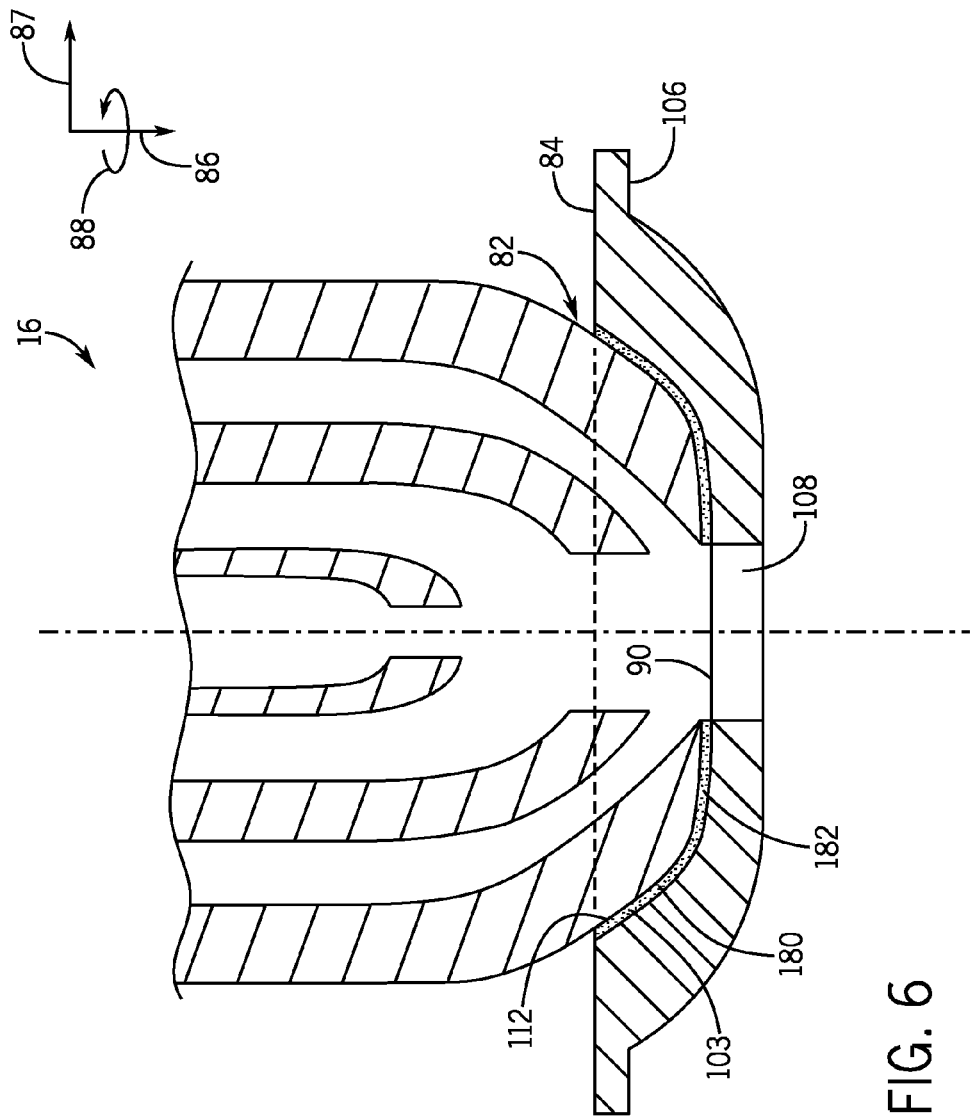
FIG. 6 is an axial cross-section of an embodiment of a feed injector coupled to the tip cap of FIG. 2 with a high temperature adhesive.

In another embodiment, depicted in FIG. 6, the tip cap 84 may be adhered to the tip 82 of the feed injector 16 with a high temperature adhesive 180. In accordance with present embodiments, the high temperature adhesive 180 may be applied to the inner surface 103 of the tip cap 84 and/or to the outer surface 112 of the feed injector 16, such that the adhesive 180 forms an interface 182 between the outer surface 112 of the tip portion 82 and the inner surface 103 of the tip cap 84. The high temperature adhesive 180 may be a low expansion, high temperature alloy, metal, or ceramic (e.g., an epoxy adhesive, a urethane adhesive, etc.) that may bond the tip cap 84 to the tip portion 82 even at high temperatures, such as temperatures between 900 and 1,200° C.

Embodiments in which the tip cap 84 is adhered to the feed injector 16 may also enable retrofitting and servicing. For example, in a retrofitting operation, the feed injector 16 may be removed from the gasifier 18, cleaned, and, in certain embodiments, etched or milled to enhance the surface area of the outer surface 112. The adhesive 180 may then be placed on the outer surface 112 of the feed injector 16 and/or on the inner surface 103 of the tip cap 84, and the tip cap 84 may be placed against the feed injector 16 for a suitable amount of time to enable sufficient curing of the adhesive 180.

In a servicing operation after the tip cap 84 has been installed, the feed injector 16 having the tip cap 84 may be removed from the gasifier 18, and the adhesive may be chemically and/or physically degraded. For example, the adhesive 180 may be selected so as to dissolve under certain chemical and/or physical conditions, such as using a suitable solvent under suitable conditions (e.g., at a certain temperature and pressure). In other embodiments, the adhesive 180 may be selected so as to lose a desired amount of adhesiveness upon exposure to incident stimuli, such as infrared or ultraviolet light. Indeed, any methods utilized to reduce or altogether degrade the adhesiveness of the adhesive 180 for servicing and/or removal are presently contemplated. Once removed, the adhesive 180 may then be replaced using the same or a different adhesive.

FIG. 7 is a side view an embodiment in which the tip cap 84 is coupled to the tip portion 82 of the feed injector 16 using a tapered face connection 188. In the illustrated embodiment, the outer surface 112 of the tip portion 82 may contain tapered slits 190 (tapered with an increasing indention in the circumferential direction 88) at two or more locations, such as between two and ten, two and six, or two and four locations. The tapered slits 190 (shown in dashed lines) may be evenly spaced circumferentially 88 around the tip cap 84, or in another suitable arrangement. In addition, the slits 190 may include recesses 191 (shown in dashed lines), which are configured to receive corresponding dowel pins 192 (shown in dashed lines) of the tip cap 84 during engagement.

The tip cap 84 may include spring-loaded dowel pins 192, and protrusions 194 (shown in dashed lines) that substantially mirror the slits 190 in the outer tip surface 112 (e.g., be tapered with an increasing thickness so as to enable a press or friction-based fit, or interference fit). Again, the spring-loaded dowel pins 192 may compress during engagement of the tip cap 82 and feed injector 16. As the dowel pins 192 pass over the recesses 191 when the tip cap 84 is rotated in the circumferential direction 88, the dowel pins 192 may release into the recesses 191 to lock the tip cap 84 in place.

In other embodiments, the tip cap 84 may not include the dowel pins 192 and/or the feed injector 16 may not include the recesses 191. Thus, the tip cap 84 may be secured to the feed injector 16 by action of the protrusions 194 sliding into a press fit with the tapered slits 190. Accordingly, in certain embodiments, the tip cap 84 may be secured to the feed injector 16 using only a friction fit.

In a similar manner to the embodiments discussed above, the tapered face connection 188 also enables retrofitting and/or servicing. For example, in a retrofitting operation, the feed injector 16 may be removed from the gasifier 18, cleaned, and machined to include the tapered slits 190 and/or the recesses 191. An embodiment of the tip cap 84 having the protrusions 194 and/or dowel pins 192 may then be secured to the feed injector 16.

In a servicing operation, the feed injector 16 having the tip cap 84 may be removed from the gasifier 18. The tip cap 84 may then be removed by rotating the tip cap 84 with respect to the feed injector 16 in a circumferential direction opposite the circumferential direction used to secure the tip cap 84. In other words, the tip cap 84 may be unscrewed from the feed injector 16. The feed injector 16 may be cleaned and further treated as appropriate. The tip cap 84 may be discarded and replaced, or refurbished and, where appropriate, re-secured to the feed injector 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gasification feed injector, comprising a tip portion disposed at a fluid exit region of the gasification feed injector, wherein the tip portion comprises a first abutment surface having a first geometry; and
a tip cap coupled to the tip portion of the gasification feed injector, wherein the tip cap is configured to serve as a thermal barrier for the tip portion during gasification reactions, and wherein the tip cap comprises:
a second abutment surface facing the first abutment surface and having a second geometry, wherein the second geometry substantially mirrors the first geometry; and
an outer surface comprising a third geometry, wherein the third geometry is convex with respect to the gasification feed injector.

2. The system of claim 1, wherein the tip cap is coupled to the tip portion such that the tip cap entirely separates the tip portion from a reaction zone of a gasifier configured to receive the gasification feed injector.

3. The system of claim 1, wherein the tip cap comprises a first annular opening positioned substantially coaxially relative to a second annular opening of the tip portion, and the first annular opening has a larger diameter than the second annular opening.

4. The system of claim 3, wherein the tip cap comprises a body having the first annular opening, wherein the thickness of the body increases in a direction radially away from the first annular opening.

5. The system of claim 3, wherein the tip cap is constructed of a ceramic matrix composite (CMC) material comprising a plurality of plies, and a number of plies of the tip cap increases in the direction radially away from the first annular opening to create the increase in body thickness.

6. The system of claim 5, wherein the first annular opening comprises a first diameter and a second diameter such that the first annular opening is tapered, and wherein a first region proximate the first diameter comprises a first number of plies, a second region proximate the second diameter comprises a second number of plies, and the second number of plies is greater than the first.

7. The system of claim 5, wherein the CMC material is configured to have a higher thermal conductivity than the tip portion.

8. The system of claim 5, wherein the CMC material is configured to have a lower thermal coefficient of expansion than the tip portion.

9. The system of claim 1, wherein the tip cap comprises a lip extending circumferentially around and radially away from a body of the tip cap, and the lip is configured to block recirculating gases generated during the gasification reactions from contacting the gasification feed injector.

10. The system of claim 1, wherein the tip cap is coupled to the tip portion with a high temperature threaded fastener, a high temperature adhesive, spring loaded tabs, a tapered face connection, or any combination thereof.

11. An apparatus, comprising:
a tip cap comprising:
a body having a first annular opening, wherein the thickness of the body increases in a direction radially away from the first annular opening;
a first abutment surface disposed on the body, wherein the first abutment surface has a first geometry that substantially mirrors a second geometry of a second abutment surface of a gasification feed injector; and
a lip extending circumferentially around and radially away from the body, wherein the lip has a lip diameter that is larger than an injector diameter of the gasification feed injector.

12. The system of claim 11, wherein the tip cap is constructed of a ceramic matrix composite (CMC) material.

13. The apparatus of claim 11, wherein the CMC material comprises a silicon carbide CMC.

* * * * *